United States Patent
Chou et al.

(10) Patent No.: US 7,289,339 B2
(45) Date of Patent: Oct. 30, 2007

(54) INVERTER CIRCUIT FOR INHIBITING ELECTRICITY TRANSMISSION INTERFERENCE

(75) Inventors: Chin-Wen Chou, Taipei Hsien (TW); Ying-Nan Cheng, Taipei Hsien (TW); Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 450 days.

(21) Appl. No.: 10/950,565

(22) Filed: Sep. 28, 2004

(65) Prior Publication Data

US 2006/0072255 A1   Apr. 6, 2006

(51) Int. Cl.
*H02M 3/335* (2006.01)
*G05F 1/40* (2006.01)

(52) U.S. Cl. .................................. 363/21.07
(58) Field of Classification Search ............. 363/21.01, 363/21.04, 21.07, 21.09, 21.15, 21.17, 39, 363/40, 95, 97, 131
See application file for complete search history.

(56) References Cited

U.S. PATENT DOCUMENTS

| | | | | |
|---|---|---|---|---|
| 5,301,095 A | * | 4/1994 | Teramoto et al. | 363/21.07 |
| 5,862,044 A | * | 1/1999 | Shioya et al. | 363/21.07 |
| 6,434,024 B2 | * | 8/2002 | Shirato | 363/21.07 |
| 6,693,803 B2 | * | 2/2004 | Beranger et al. | 363/21.07 |
| 6,735,095 B2 | * | 5/2004 | Fahlenkamp et al. | 363/21.15 |
| 6,834,002 B2 | * | 12/2004 | Yang | 363/89 |
| 6,906,932 B2 | * | 6/2005 | Kung et al. | 363/21.07 |
| 6,958,919 B1 | * | 10/2005 | Kung | 363/17 |

* cited by examiner

*Primary Examiner*—Matthew V. Nguyen
(74) *Attorney, Agent, or Firm*—Birch, Stewart, Kolasch, and Birch, LLP

(57) ABSTRACT

An inverter circuit for inhibiting electricity transmission interference receives an electric signal output from an electricity input circuit, and includes a control unit to output an operating frequency, an actuation circuit to receive the operating frequency and divide the electric signal and output an actuation signal, and a transformer to receive the actuation signal and transform electricity to actuate a first load to operate. The actuation unit and the control unit are bridged by an isolation unit which separates grounding of the actuation unit and control unit on the first side and the second side of the transformer to enable the control unit to output the steady operating frequency and inhibit electric transmission interference.

10 Claims, 6 Drawing Sheets

US 7,289,339 B2

INVERTER CIRCUIT FOR INHIBITING ELECTRICITY TRANSMISSION INTERFERENCE

FIELD OF THE INVENTION

The present invention relates to an inverter circuit for inhibiting electricity transmission interference and particularly to an inverter circuit for transforming varying electric current and voltage.

BACKGROUND OF THE INVENTION

FIG. 1 shows a conventional power supply circuit diagram for a video product, such as a liquid crystal display (LCD) panel or a LCD TV. The video product has an AC input unit connecting to city power. The AC input unit receives AC electric signals which are converted by a rectification unit consisting of a diode cluster to become pulse wave DC electric signals, which are then corrected by a power factor regulator to become stable DC electric signals. The stable DC electric signals are coupled in parallel and output to an inverter and a second transformer through a second actuation circuit. The second transformer aims to lower the voltage to output a low voltage electric signal to drive a second load. The inverter aims to boost the voltage to output a high voltage electric signal to actuate a first load. The second load includes low voltage actuated devices, such as a video signal processing circuit, speakers, and the like. The first load is a cold cathode fluorescent lamp to illuminate the display panel.

The circuit diagram for the conventional video product set forth above shows that the electricity sources share the same rectification unit and same actuation circuit. Hence, the first load and the second load are grounded together. As the second load is actuated by a low voltage electricity and must maintain a stable DC electric signal during actuation, if the electric signal are interfered with and fluctuate, the operation performance of the second load will be affected. For instance, fluctuation stripes might appear on the display plane, color becomes non-uniform, and output sound quality of the speaker drops and noises occur. Another electricity interference takes place in the inverter circuit. The inverter circuit includes a control unit to output operation frequency, as actuation unit to receive the operating frequency and divide the electric signal and output an actuation signal, and a first transformer to receive the actuation signal and transform electricity to output a high voltage signal to drive the first load. Referring to FIG. 2, while the actuation circuit is receiving the operating frequency and dividing the electric signal, charging and fluctuation of the electric signal occurs. The fluctuation of the electric signal also affects the control unit and results in unstable operating frequency and blinking on the first load.

The interference mainly is caused by the oscillation generated by the inverter during boosting of the voltage. The oscillating electric energy affects the second load and the control unit from the jointed grounding end. As a result, the second load and the control unit are affected by the electric transmission interference of the inverter. This phenomenon frequently happens to large size video products. It has a great impact to the video and audio quality of the video products.

SUMMARY OF THE INVENTION

Therefore, the primary object of the present invention is to solve the aforesaid disadvantages. The invention provides a separated grounding method for the existing first side and second side of the first transformer, and also provides an isolation unit between the actuation unit and the control unit of the inverter that are coupled to the first side and the second side so that oscillation electric energy interference resulting from the actuation unit during dividing the electric signal through the operating frequency may be isolated. Hence, the operating frequency of the control unit may be stabilized to prevent blinking from occurring to the first load, and the electric interference effect on the second load may be inhibited to maintain normal video presentation.

The foregoing, as well as additional objects, features and advantages of the invention will be more readily apparent from the following detailed description, which proceeds with reference to the accompanying drawings.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
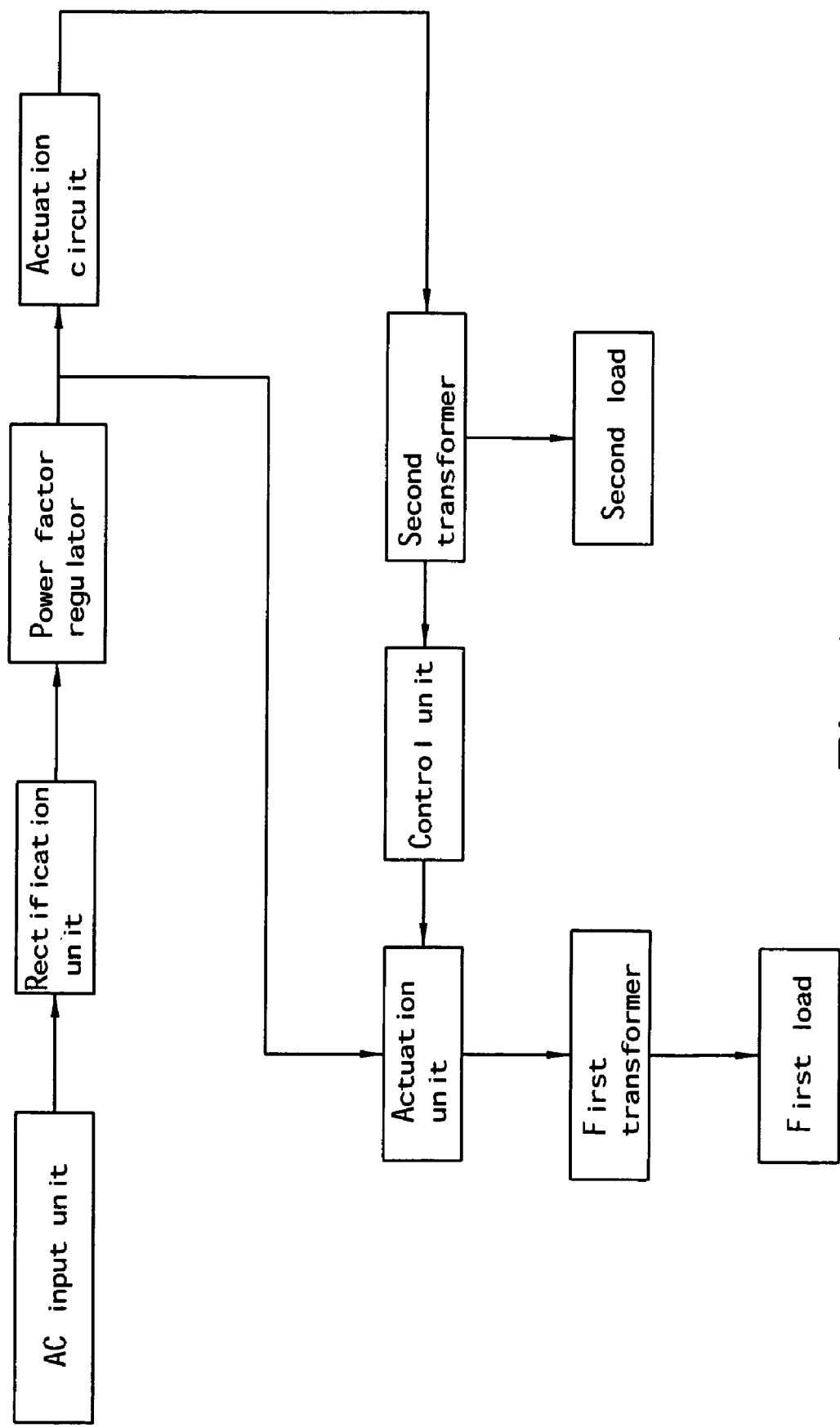
FIG. 1 is a power supply circuit block diagram of a conventional video product.
Figure 2:
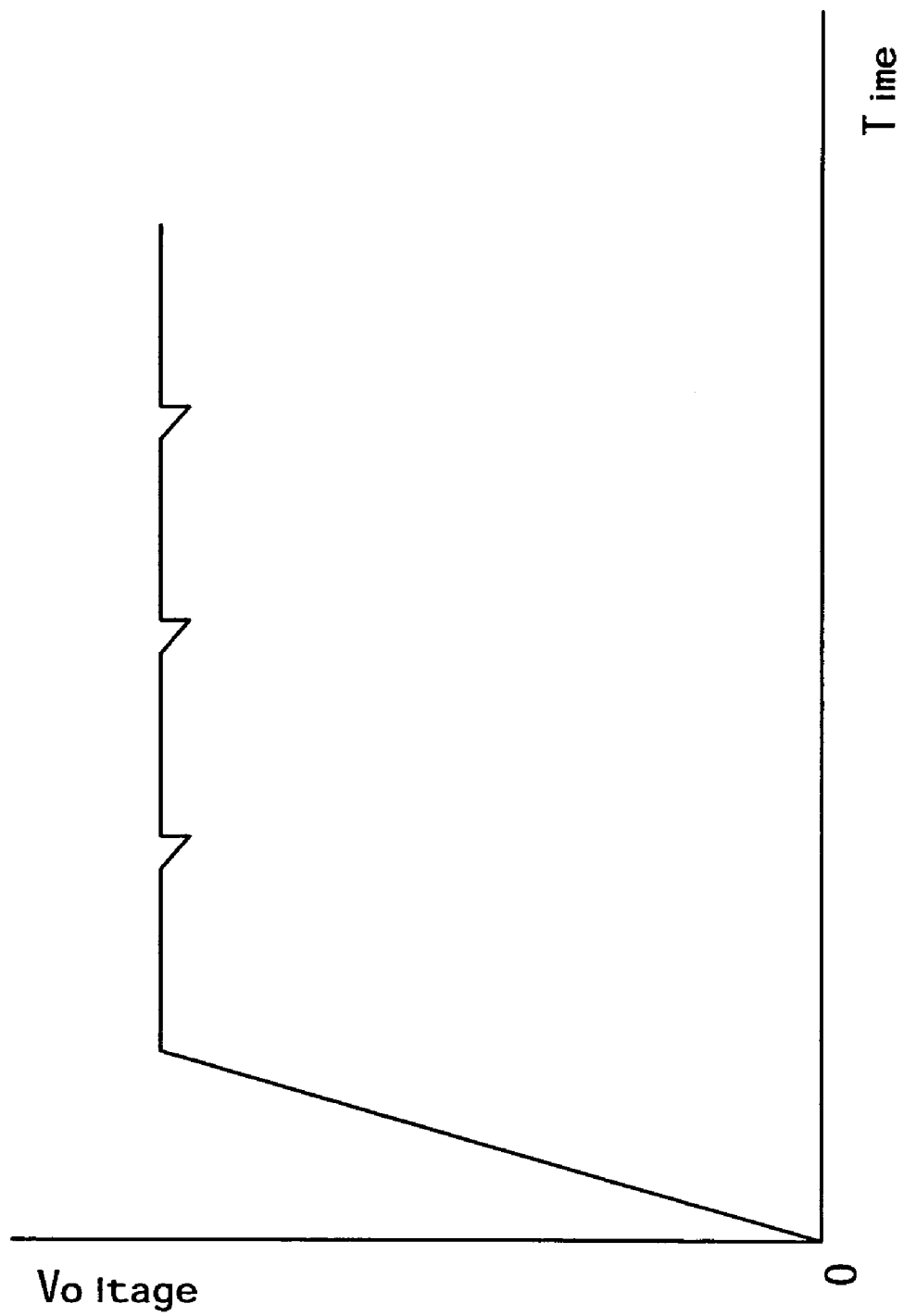
FIG. 2 is a timeline chart showing an actuation unit dividing an electric signal through an operating frequency.
Figure 3:
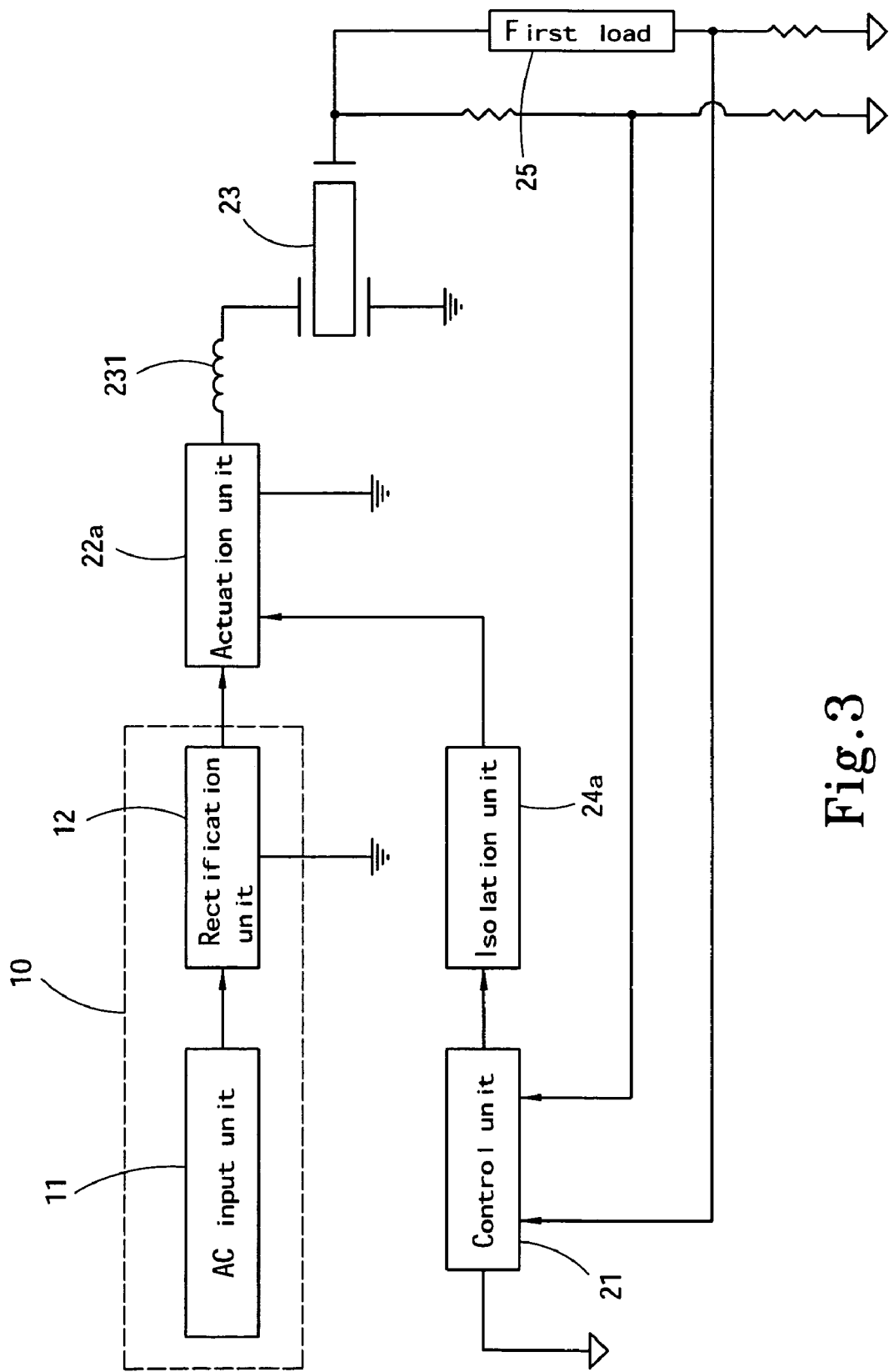
FIG. 3 is a schematic view of a first embodiment of an inverter circuit of the invention.
Figure 4:
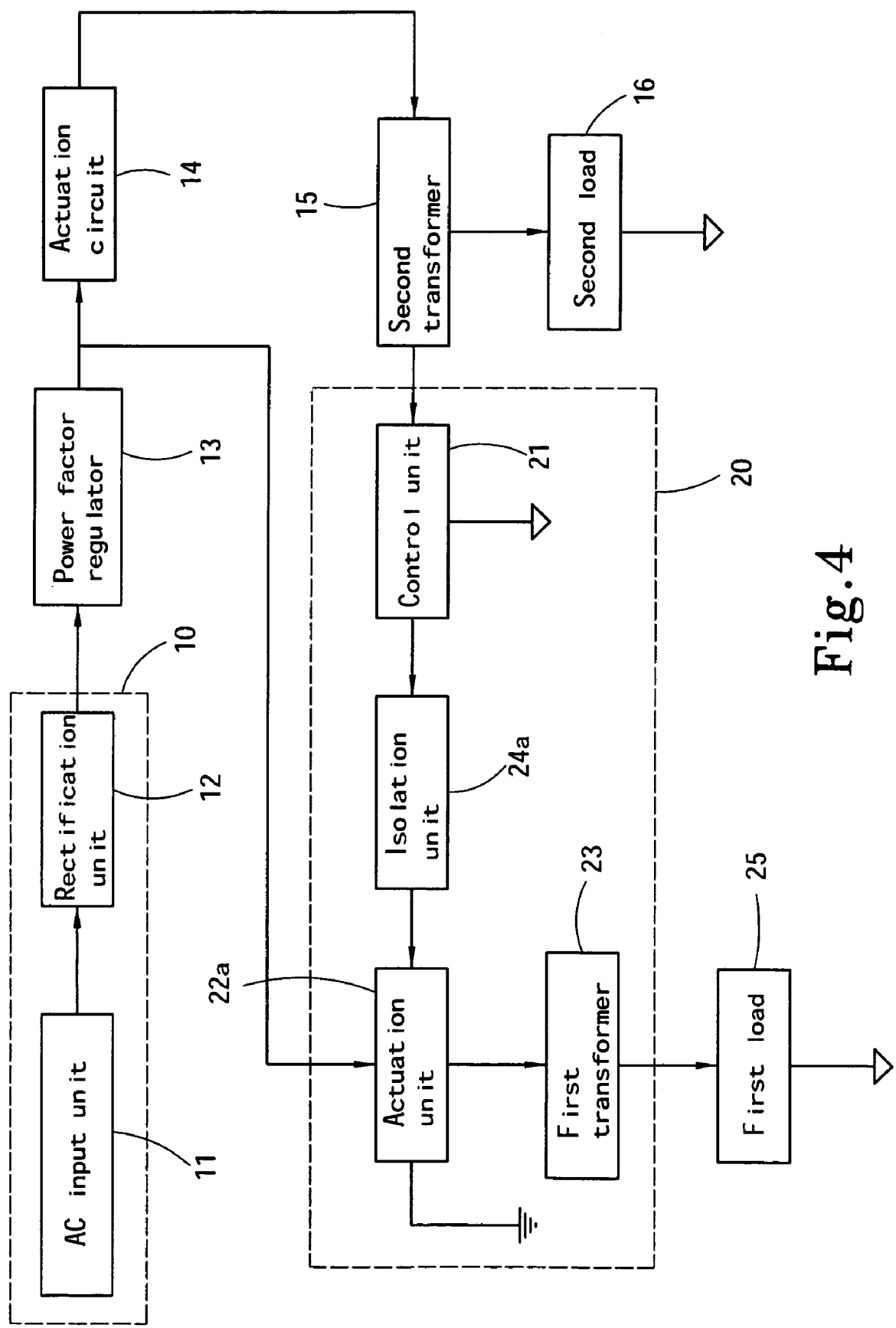
FIG. 4 is a schematic view of the entire circuit of the first embodiment of the invention.

Referring to FIGS. 3 and 4, according to the present invention, an electricity input circuit 10 outputs an electric signal to an inverter circuit 20. The electricity input circuit 10 includes an AC input unit 11 and a rectification unit 12 to convert AC to DC. The inverter circuit 20 includes a control unit 21 to output an operating frequency, an actuation unit 22a to receive the operating frequency and divide the electric signal, and output an actuation signal, and a first transformer 23 to receive the actuation signal and transform electricity to actuate a first load 25 to operate. The first load 23 also sends feedback voltage and current signal to the control unit 21. There is an isolation unit 24a located between the actuation unit 22a and the control unit 21. Through the isolation unit 24a, the actuation unit 22a and the control unit 21 separated by the first side and the second side of the first transformer 23 are isolated and grounded separately. The first transformer 23 may be a wired transformer or a piezoelectric transformer. For the piezoelectric transformer, an inductor 231 is provided between the first transformer 23 and the actuation unit 22a. To facilitate description, the following discussion of the inverter circuit 20 uses the piezoelectric transformer as an example.

FIG. 4 shows a first embodiment of the entire circuit of the invention. The electricity input circuit 10 is coupled to parallel with an actuation circuit 14. The actuation circuit 14, the inverter circuit 20 and the rectification unit 12 are bridged by a power factor regulator 13 which performs power correction. Output electric signal is a stable DC signal (12 DCV-48 DCV). The actuation circuit 14 outputs an actuation signal to a second transformer 15 to transform electricity to actuate a second load 16. The second transformer 15 also outputs an electric signal to actuate the control unit 21. The present structure has two circuit boards to hold respectively the inverter circuit 20 and the actuation circuit 14, also referring to FIG. 3. As the present invention has an isolation unit 24a formed by a photo coupler, capacitor or transformer 23 located on the first side and the second side to isolate the actuation unit 22a and the control unit 21 and match the existing first side and the second side of the existing first transformer, the actuation unit 22a may be grounded separately from the control unit 21 and the first load 25. Moreover, the second transformer 15 also has a first side and a second side, and the second load 16 and the actuating unit 22a also are grounded separately. Hence, electric energy fluctuation resulting from the electric signal dividing by the operating frequency of the actuation unit 22a is inhibited without transmitting from the ground end to the control unit 21 and the second load 16. Therefore, operating frequency output from the control unit 21 may be stabilized to enable the cold cathode fluorescent lamp (CCFL) of the first load 25 to generate a desired luminance effect. As the control unit 21 and the first load 25 also are grounded separately, the second load 16 for the video processing circuit and speaker does not have electric interference, thus a steady video output quality may be achieved.

Figure 5:
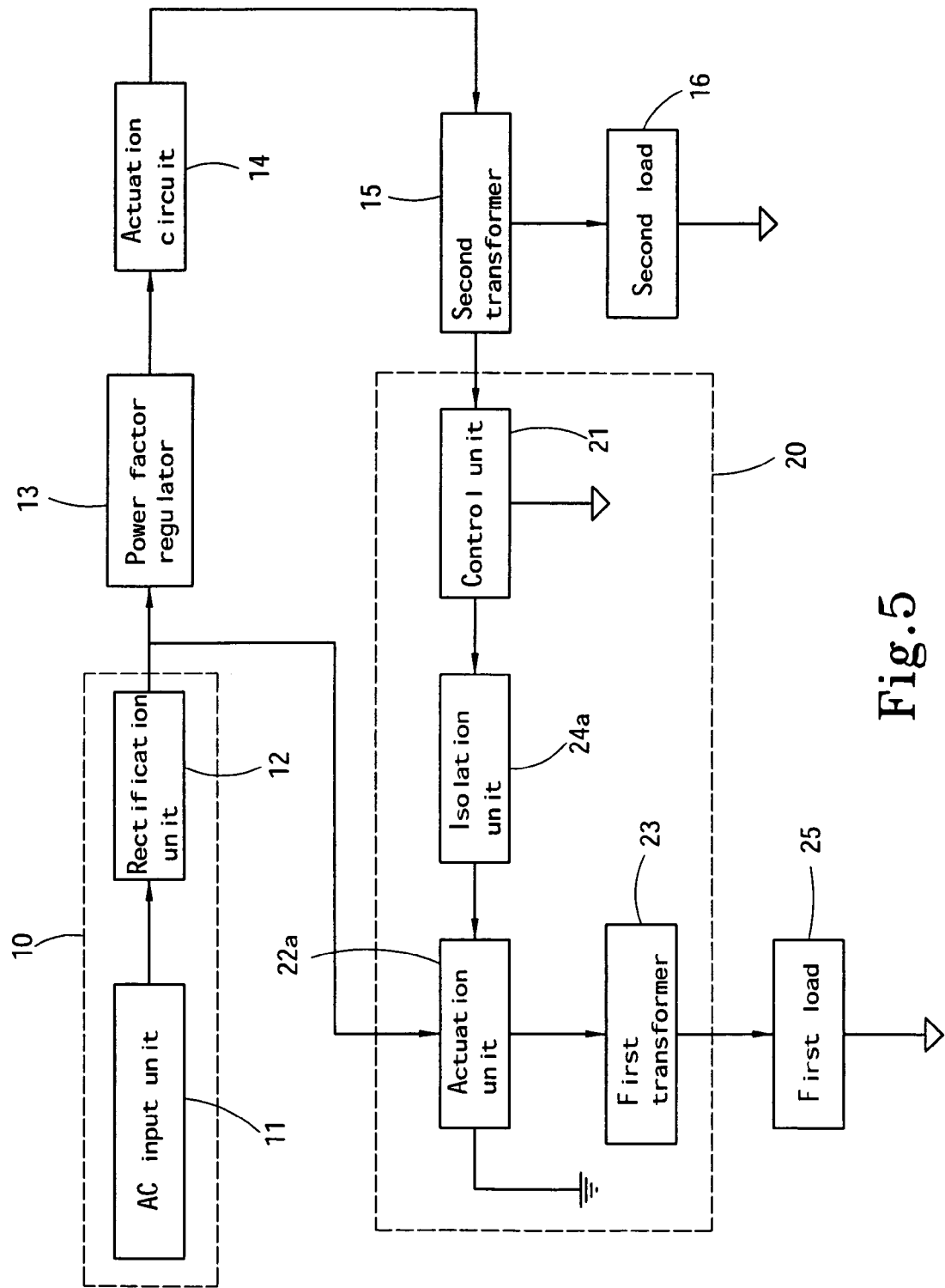
FIG. 5 is a schematic view of the entire circuit of a second embodiment of the invention.

FIG. 5 shows a second embodiment of the entire circuit of the invention. It differs from the first embodiment shown in FIG. 4 by having the inverter circuit 20 directly receive the electric signal output from the rectification unit 12. The electric signal is a pulse DC signal which is directly input to the actuation unit 22a and the first transformer 23. As the input is a medium voltage signal (150 DCV-300 DCV), power loss caused by the low voltage electric transformation may be avoided, and the electric interference may also be inhibited as previously discussed.

Figure 6:
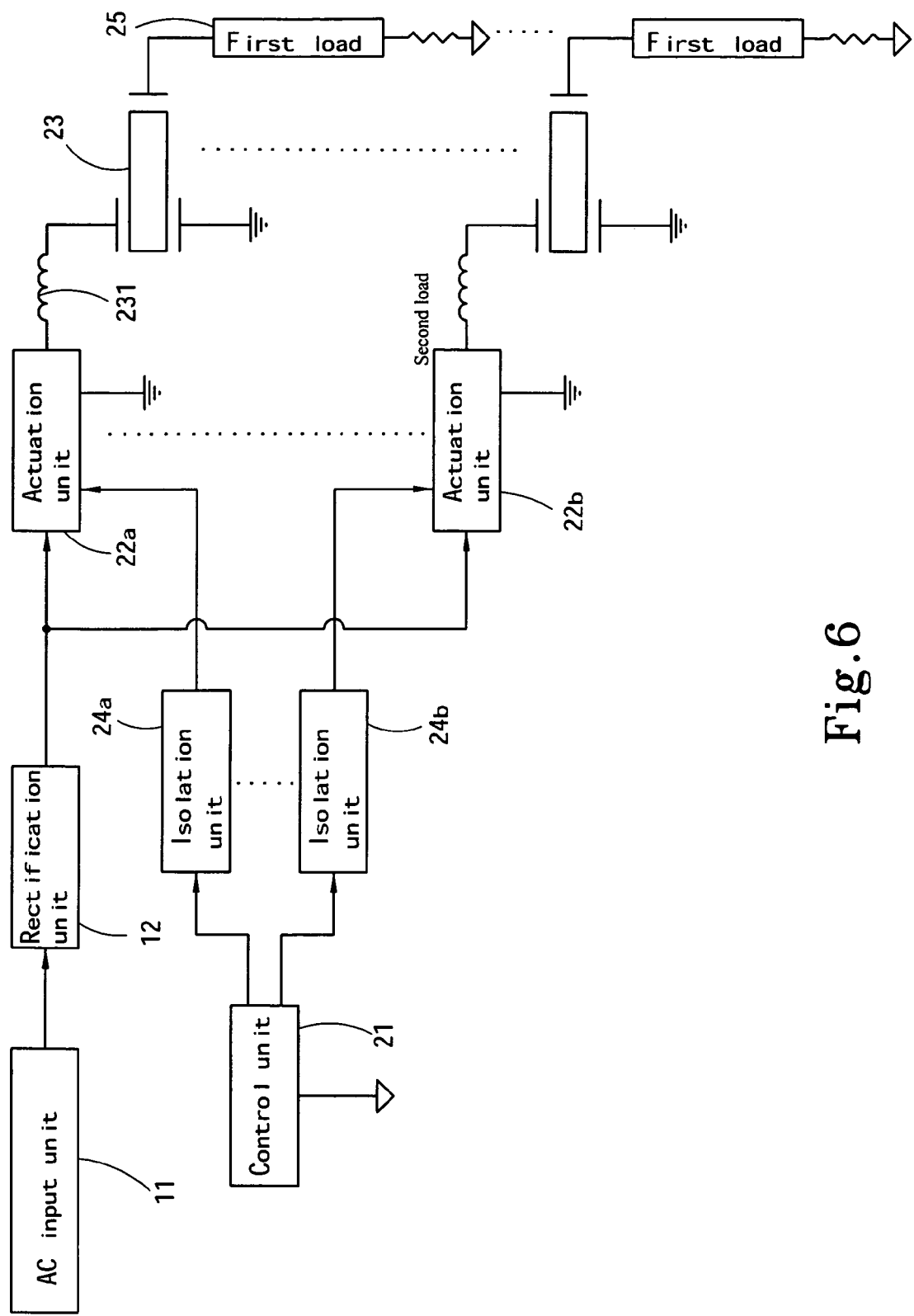
FIG. 6 is a schematic view of the second embodiment of an inverter circuit of the invention.

FIG. 6 shows a second embodiment of the inverter circuit 20. The inverter circuit 20 includes a control unit 21 to output the same frequency at the same time to drive a plurality of actuation units 22a, 22b. The control unit 21 and each actuation unit 22a, 22b are bridged by an isolation unit 24a, 24b. It also can inhibit the electric interference as previously discussed.

While the preferred embodiments of the invention have been set forth for the purpose of disclosure, modifications of the disclosed embodiments of the invention as well as other embodiments therefor may occur to those skilled in the art. Accordingly, the appended claims are intended to cover all embodiments which do not depart from the spirit and scope of the invention.

What is claimed is:

1. An inverter circuit for inhibiting electricity transmission interference comprising an electricity input circuit to output an electric signal to an inverter circuit which includes a control unit to output an operating frequency, an actuation unit to receive the operating frequency to divide the electric signal and output an actuation signal, and a first transformer to receive the actuation signal to transform electricity to actuate a first load to operate;

wherein the actuation unit and the control unit are bridged by an isolation unit to isolate and separately ground the actuation unit and the control unit on a first side and a second side of the first transformer to inhibit the electric transmission interference; and wherein the electricity input circuit is coupled with an actuation circuit in parallel, the actuation circuit outputting an actuation signal to a second transformer for electricity transformation to drive a second load, the second transformer also outputting an electric signal to actuate the control unit.

2. The inverter circuit for inhibiting electricity transmission interference of claim 1, wherein the first load sends a feedback voltage and current signal to the control unit, the first load and the control unit being jointly grounded.

3. The inverter circuit for inhibiting electricity transmission interference of claim 1, wherein the electric signal is a stabilized DC signal or a pulse DC signal.

4. The inverter circuit for inhibiting electricity transmission interference of claim 1, wherein the electricity input circuit includes an AC input unit and a rectification unit for converting AC to DC.

5. The inverter circuit for inhibiting electricity transmission interference of claim 4, wherein the rectification unit and the actuation unit are bridged by a power factor regulator.

6. The inverter circuit for inhibiting electricity transmission interference of claim 1, wherein the second load and the control unit and the first load are jointly grounded.

7. The inverter circuit for inhibiting electricity transmission interference of claim 1, wherein the second load is a video processing circuit and a speaker.

8. The inverter circuit for inhibiting electricity transmission interference of claim 1, wherein the actuation circuit and the electricity input circuit are bridged by a power factor regulator.

9. The inverter circuit for inhibiting electricity transmission interference of claim 1, wherein the isolation unit includes a photo coupler, a capacitor or a transformer coupled on the first side and the second side.

10. The inverter circuit for inhibiting electricity transmission interference of claim 1, wherein the first load is a cold cathode fluorescent lamp.

* * * * *